United States Patent [19]
Panwar

[11] Patent Number: 6,094,719
[45] Date of Patent: *Jul. 25, 2000

[54] REDUCING DATA DEPENDENT CONFLICTS BY CONVERTING SINGLE PRECISION INSTRUCTIONS INTO MICROINSTRUCTIONS USING RENAMED PHANTOM REGISTERS IN A PROCESSOR HAVING DOUBLE PRECISION REGISTERS

[75] Inventor: Ramesh Panwar, Santa Clara, Calif.

[73] Assignee: Sun Microsystems, Inc., Palo Alto, Calif.

[*] Notice: This patent is subject to a terminal disclaimer.

[21] Appl. No.: 08/881,958

[22] Filed: Jun. 25, 1997

[51] Int. Cl.$^7$ ........................................ G06F 9/302
[52] U.S. Cl. .................... 712/216; 712/217; 712/222; 712/23; 708/513
[58] Field of Search .................... 395/392, 393, 395/563, 800.23; 364/748.19; 712/216, 217, 222, 23; 708/513

[56] References Cited

U.S. PATENT DOCUMENTS

| | | | |
|---|---|---|---|
| 5,134,561 | 7/1992 | Liptay ........................................ 711/164 |
| 5,446,912 | 8/1995 | Colwell et al. ........................... 712/217 |
| 5,487,156 | 1/1996 | Popescu et al. .......................... 712/217 |
| 5,546,554 | 8/1996 | Yung et al. ............................... 712/203 |
| 5,546,597 | 8/1996 | Martell et al. ............................ 712/23 |
| 5,560,032 | 9/1996 | Nguyen et al. ........................... 712/23 |
| 5,561,776 | 10/1996 | Popescu et al. .......................... 712/239 |
| 5,590,295 | 12/1996 | Deosaran et al. ........................ 712/217 |
| 5,613,132 | 3/1997 | Clift et al. ................................. 712/217 |
| 5,625,837 | 4/1997 | Popescu et al. .......................... 712/23 |
| 5,630,149 | 5/1997 | Bluhm ...................................... 712/217 |
| 5,651,125 | 7/1997 | Witt et al. ................................. 712/218 |
| 5,701,508 | 12/1997 | Glew et al. ............................... 712/23 |
| 5,708,837 | 1/1998 | Handlogten .............................. 712/23 |
| 5,729,723 | 3/1998 | Wada et al. .............................. 712/222 |
| 5,790,827 | 8/1998 | Leung ...................................... 712/216 |

OTHER PUBLICATIONS

David L. Weaver/Tom Germond, *The SPARC Architecture Manual*, SPARC International, Inc., Version 9, 1994, Ch. 5, pp. 29–60.

*Primary Examiner*—Kenneth S. Kim
*Attorney, Agent, or Firm*—William J. Kubida; Steven K. Barton; Hogan & Hartson LLP

[57] ABSTRACT

In an out-of-order processor having single-precision floating-point registers aliased into double-precision floating-point registers, a single-precision floating-point arithmetic operation having four possible register dependencies is converted into two microinstructions which are processed normally within the processor. The first microinstruction is coded to perform the arithmetic operation specified by the single-precision instruction using the first and second source registers specified and storing the result in a phantom register. The second microinstruction is coded for merging the contents of the phantom register and the destination register specified. Each microinstruction has at most two possible register dependencies, thereby reducing the total number of register dependencies which the processor is required to track.

12 Claims, 7 Drawing Sheets

Fig. 1A

| OPERAND REGISTER ID | OPERAND FROM |
|---|---|
| f31 | f31<31:0> |
| f30 | f30<31:0> |
| f29 | f29<31:0> |
| f28 | f28<31:0> |
| f27 | f27<31:0> |
| f26 | f26<31:0> |
| f25 | f25<31:0> |
| f24 | f24<31:0> |
| f23 | f23<31:0> |
| f22 | f22<31:0> |
| f21 | f21<31:0> |
| f20 | f20<31:0> |
| f19 | f19<31:0> |
| f18 | f18<31:0> |
| f17 | f17<31:0> |
| f16 | f16<31:0> |
| f15 | f15<31:0> |
| f14 | f14<31:0> |
| f13 | f13<31:0> |
| f12 | f12<31:0> |
| f11 | f11<31:0> |
| f10 | f10<31:0> |
| f9 | f9<31:0> |
| f8 | f8<31:0> |
| f7 | f7<31:0> |
| f6 | f6<31:0> |
| f5 | f5<31:0> |
| f4 | f4<31:0> |
| f3 | f3<31:0> |
| f2 | f2<31:0> |
| f1 | f1<31:0> |
| f0 | f0<31:0> |

Fig. 1B

| OPERAND REGISTER ID | OPERAND FIELD | FROM REGISTER |
|---|---|---|
| f30 | <31:0> | f31 <31:0> |
|  | <63:32> | f30 <31:0> |
| f28 | <31:0> | f29 <31:0> |
|  | <63:32> | f28 <31:0> |
| f26 | <31:0> | f27 <31:0> |
|  | <63:32> | f26 <31:0> |
| f24 | <31:0> | f25 <31:0> |
|  | <63:32> | f24 <31:0> |
| f22 | <31:0> | f23 <31:0> |
|  | <63:32> | f22 <31:0> |
| f20 | <31:0> | f21 <31:0> |
|  | <63:32> | f20 <31:0> |
| f18 | <31:0> | f19 <31:0> |
|  | <63:32> | f18 <31:0> |
| f16 | <31:0> | f17 <31:0> |
|  | <63:32> | f16 <31:0> |
| f14 | <31:0> | f15 <31:0> |
|  | <63:32> | f14 <31:0> |
| f12 | <31:0> | f13 <31:0> |
|  | <63:32> | f12 <31:0> |
| f10 | <31:0> | f11 <31:0> |
|  | <63:32> | f10 <31:0> |
| f8 | <31:0> | f9 <31:0> |
|  | <63:32> | f8 <31:0> |
| f6 | <31:0> | f7 <31:0> |
|  | <63:32> | f6 <31:0> |
| f4 | <31:0> | f5 <31:0> |
|  | <63:32> | f4 <31:0> |
| f2 | <31:0> | f3 <31:0> |
|  | <63:32> | f2 <31:0> |
| f0 | <31:0> | f1 <31:0> |
|  | <63:32> | f0 <31:0> |

REDUCING DATA DEPENDENT CONFLICTS BY CONVERTING SINGLE PRECISION INSTRUCTIONS INTO MICROINSTRUCTIONS USING RENAMED PHANTOM REGISTERS IN A PROCESSOR HAVING DOUBLE PRECISION REGISTERS

CROSS-REFERENCES TO RELATED APPLICATIONS

The subject matter of the present application is related to that of U.S. patent application Ser. No. 08/881,729 identified as Docket No. P2346/37178.830072.000 for APPARATUS FOR PRECISE ARCHITECTURAL UPDATE IN AN OUT-OF-ORDER PROCESSOR filed concurrently herewith by Ramesh Panwar and Arjun Prabhu; Ser. No. 08/881,726 identified as Docket No. P2348/37178.830073.000 for AN APPARATUS FOR NON-INTRUSIVE CACHE FILLS AND HANDLING OF LOAD MISSES filed concurrently herewith by Ramesh Panwar and Ricky C. Hetherington; Ser. No. 08/881,908 identified as Docket No. P2349/37178.830074.000 for AN APPARATUS FOR HANDLING COMPLEX INSTRUCTIONS IN AN OUT-OF-ORDER PROCESSOR filed concurrently herewith by Ramesh Panwar and Dani Y. Dakhil; Ser. No. 08/882,173, now issued U.S. Pat. No. 5,898,853, identified as Docket No. P2350/37178.830075.000 for AN APPARATUS FOR ENFORCING TRUE DEPENDENCIES IN AN OUT-OF-ORDER PROCESSOR filed concurrently herewith by Ramesh Panwar and Dani Y. Dakhil; Ser. No. 08/881,145 identified as Docket No. P2351/37178.830076.000 for APPARATUS FOR DYNAMICALLY RECONFIGURING A PROCESSOR filed concurrently herewith by Ramesh Panwar and Ricky C. Hetherington; Ser. No. 08/881,732 identified as Docket No. P2353/37178.830077.000 for APPARATUS FOR ENSURING FAIRNESS OF SHARED EXECUTION RESOURCES AMONGST MULTIPLE PROCESSES EXECUTING ON A SINGLE PROCESSOR filed concurrently herewith by Ramesh Panwar and Joseph I. Chamdani; Ser. No. 08/882,175 identified as Docket No. P2355/37178.830078.000 for SYSTEM FOR EFFICIENT IMPLEMENTATION OF MULTI-PORTED LOGIC FIFO STRUCTURES IN A PROCESSOR filed concurrently herewith by Ramesh Panwar; Ser. No. 08/882,311 identified as Docket No. P2365/37178.830080.000 for AN APPARATUS FOR MAINTAINING PROGRAM CORRECTNESS WHILE ALLOWING LOADS TO BE BOOSTED PAST STORES IN AN OUT-OF-ORDER MACHINE filed concurrently herewith by Ramesh Panwar, P. K. Chidambaran and Ricky C. Hetherington; Ser. No. 08/881,731 identified as Docket No. P2369/37178.830081.000 for APPARATUS FOR TRACKING PIPELINE RESOURCES IN A SUPERSCALAR PROCESSOR filed concurrently herewith by Ramesh Panwar; Ser. No. 08/882,525 identified as Docket No. P2370/37178.830082.000 for AN APPARATUS FOR RESTRAINING OVER-EAGER LOAD BOOSTING IN AN OUT-OF-ORDER MACHINE filed concurrently herewith by Ramesh Panwar and Ricky C. Hetherington; Ser. No. 08/882,220 identified as Docket No. P2371/37178.830083.000 for AN APPARATUS FOR HANDLING REGISTER WINDOWS IN AN OUT-OF-ORDER PROCESSOR filed concurrently herewith by Ramesh Panwar and Dani Y. Dakhil; Ser. No. 08/881,847 identified as Docket No. P2372/37178.830084.000 for AN APPARATUS FOR DELIVERING PRECISE TRAPS AND INTERRUPTS IN AN OUT-OF-ORDER PROCESSOR filed concurrently herewith by Ramesh Panwar; Ser. No. 08/881,728 identified as Docket No. P2398/37178.830085.000 for NON-BLOCKING HIERARCHICAL CACHE THROTTLE filed concurrently herewith by Ricky C. Hetherington and Thomas M. Wicki; Ser. No. 08/881,727 identified as Docket No. P2406/37178.830086.000 for NON-THRASHABLE NON-BLOCKING HIERARCHICAL CACHE filed concurrently herewith by Ricky C. Hetherington, Sharad Mehrotra and Ramesh Panwar; Ser. No. 08/881,065 identified as Docket No. P2408/37178.830087.000 for IN-LINE BANK CONFLICT DETECTION AND RESOLUTION IN A MULTI-PORTED NON-BLOCKING CACHE filed concurrently herewith by Ricky C. Hetherington, Sharad Mehrotra and Ramesh Panwar; and Ser. No. 08/882,163 identified as Docket No. P2434/37178.830088.000 for SYSTEM FOR THERMAL OVERLOAD DETECTION AND PREVENTION FOR AN INTEGRATED CIRCUIT PROCESSOR filed concurrently herewith by Ricky C. Hetherington and Ramesh Panwar, the disclosures of which applications are herein incorporated by this reference.

BACKGROUND OF THE INVENTION

1. Field of the Invention

This invention relates in general to microprocessors, and more particularly, to microprocessor architectures using aliased registers in an out-of-order machine.

2. Relevant Background

Modern computer processors (also called microprocessors) conventionally provide a programmer with a choice between different levels of numeric precision for the execution and calculation of arithmetic floating-point (i.e., non-integer) operations such as add, subtract, multiply, or divide. For instance, a microprocessor could support single-precision floating-point operations and double-precision floating-point operations, wherein the double-precision floating-point operations utilize generally twice as many bits as the single-precision operations (i.e., 64-bit double-precision operations vs. 32-bit single-precision operations).

As microprocessor architectures are developed and designed for greater computer throughput and computational accuracy, double-precision or multiple-precision floating-point operations have essentially become the programmer's standard arithmetic operation. Conventional processors are now generally designed to support double-precision operations as the baseline arithmetic operation. However, because older software programs have been written for older processors using single-precision floating-point operations, it is beneficial that a processor design provide support both for double-precision floating-point operations and single-precision floating-point operations. In this way, software written using single-precision floating-point operations for an earlier generation of a processor should operate without modification on a newer design of a processor.

Figure 1A:
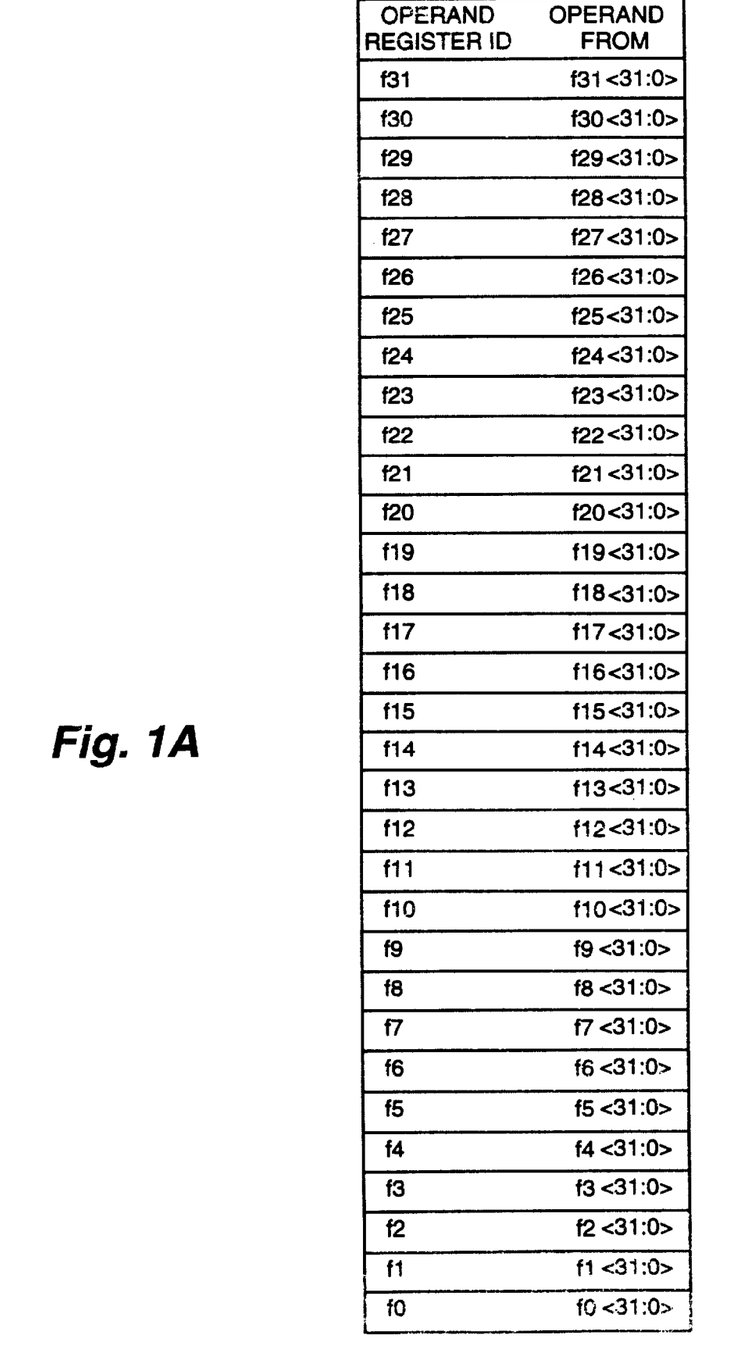
Figure 1B:
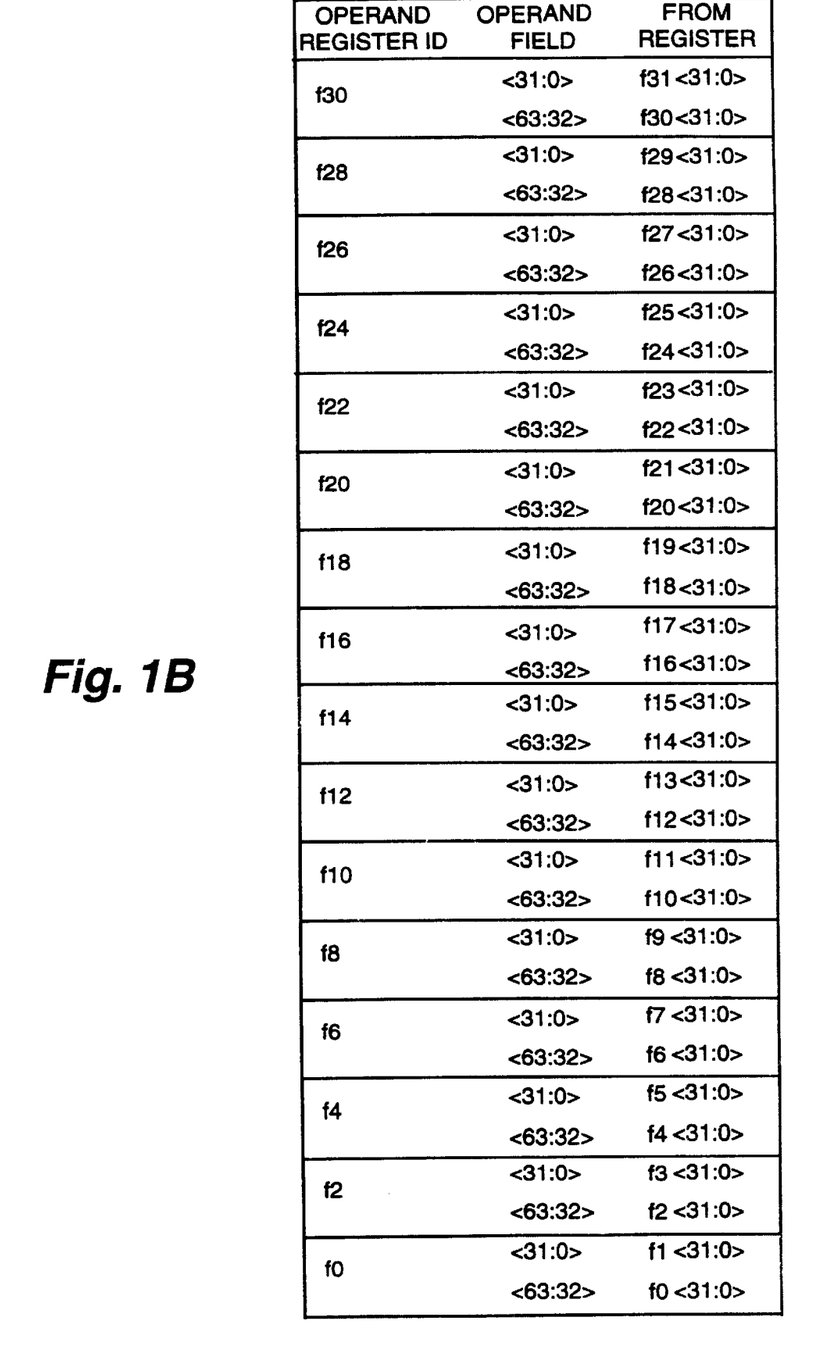
FIG. 1B shows a set of sixteen double-precision registers (64 bit) having operand identifications f0 to f30, each double-precision register overlapped or aliased with two single-precision registers.

In order to provide efficient use of the processor's register resources, single-precision floating-point registers and double-precision floating-point registers can be arranged utilizing an "aliasing" or overlapping technique. When two or more data addresses refer to the same datum, the address is said to be "aliased". FIGS. 1A and 1B illustrate such an arrangement or register file of floating-point registers utilized in SPARC, a scaleable processor architecture. FIG. 1A shows thirty-two single-precision (32 bit) registers f0, f1, f2, ... f31. FIG. 1B shows a set of sixteen double-precision (64 bit) registers f0, f2, f4, ... f30 which utilize an aliasing or overlapping arrangement to support both double-precision and single-precision floating-point operations. In the example of FIG. 1A and FIG. 1B, the double-precision register f4, single-precision register f4, and single-precision register f5 all refer to the same datum.

Referring to FIG. 1B, each double-precision register is 64 bits wide and comprises two single-precision registers. For instance, double-precision register f4 is a 64-bit register formed from the single-precision register f4 (32 bits) occupying the most significant or higher 32 bits, and the single-precision register f5 (32 bits) occupying the least significant or lower 32 bits.

When coding an arithmetic floating-point instruction, depending on the desired accuracy, a programmer could refer to a single-precision 32-bit register such as single-precision register f4 or single-precision register f5, or a double-precision 64-bit register such as double-precision register f4. In SPARC, each single-precision register is aliased to a corresponding double-precision register (i.e., single-precision f5 is aliased to double-precision f4).

For example, the following floating-point operation references double-precision registers:

fadd.d f2, f4, f6

This instruction adds the contents of double-precision registers f2 and f4 (referred to as the operands or source registers), and stores the result in double-precision register f6 (known as the destination register).

The following floating-point operation references single-precision registers:

fmul.s f3, f4, f7

This instruction multiples the contents of single-precision registers f3 and single-precision register f4, and stores the result in single-precision register f7.

Traditionally, processors have been designed using various techniques for improving their performance and increasing the number of instructions per clock cycle which the processor can execute. These techniques have included pipelining, super pipelining, super scaling, speculative instruction execution, and "out-of-order" instruction execution. While early processors executed instructions in a sequential order determined by the compiled machine language program, modern processors using multiple pipelines which can simultaneously process instructions when there are no data dependencies between the instructions in each of the pipelines. If a data dependency exists between the instructions in one or more pipelines, the pipelines "stall" and wait for the dependent data to become available.

As an example of a dependency, the following two double-precision operations share a double-precision data register (i.e., f6), and therefore the second instruction is dependent on the completion of the first operation (underline indicates dependency):

| fadd.d | f2, f4, <u>f6</u> |
| fadd.d | <u>f6</u>, f8, f10 |

With double precision registers, there are two possible dependencies per instruction since each source register can be dependent on one prior instruction.

Sequential or "in-order" processors can generally utilize aliased double-precision and single-precision registers without concern for the register dependencies between aliased registers. This is because in-order processors guarantee that each single-precision instruction would have no data register dependency due to aliasing.

However, with out-of-order operations, the number of possible dependencies that a single-precision register can have effectively doubles because a given single-precision source register could be dependent on prior operations which utilized either the same single-precision register or the aliased double-precision register. For example, a single-precision operation utilizing single-precision register f5 as a source register could be dependent upon a prior operation storing a value to a destination register utilizing either single-precision register f4 or single-precision register f5 (underline indicates dependency):

| fadd.s | f6, f9, <u>f4</u> |
| fadd.s | f0, f1, <u>f5</u> |
| fadd.s | <u>f5</u>, f7, f9 |

This is because the single-precision register f5 and single-precision register f4 are both aliased into the double-precision register f4. Hence, for single precision operations using aliased registers, there are at least four possible dependencies per instruction since each source register can have two possible dependencies.

While microprocessor architectures can be designed to track multiple dependencies between different instructions, it is desirable to reduce the number of dependencies which an out-of-order processor must track so that the processor's performance is improved.

What is needed is a system, method, and processor for handling aliased registers in an out-of-order processor so that the number of register dependencies which need to be tracked within the processor can be reduced.

SUMMARY OF THE INVENTION

The above problem has been solved by an apparat us which converts a single-precision floating-point instruction in to simpler instructions which have fewer total possible dependencies.

In an apparatus implementation of the invention, a processor expands a single precision instruction into two microinstructions of which the first produces a result into a phantom register and the second microinstruction performs a merge of the data in the phantom register and the original destination register specified by the floating point instruction. The phantom register and the microinstructions get handled and processed like any other register or operation in the processor. Each of the two microinstructions have at most two dependencies, as opposed to the four possible dependencies of the original single precision operation. Hence, the number of dependencies per instruction that the processor is required to track is reduced, thereby reducing the resources required to perform such dependency tracking.

A computer system incorporating the apparatus of the present invention is also disclosed.

The foregoing and other features, utilities and advantages of the invention will be apparent from the following more particular description of a preferred embodiment of the invention as illustrated in the accompanying drawings.

BRIEF DESCRIPTION OF THE DRAWINGS

FIG. 1, composed of FIGS. 1A and 1B, shows in FIG. 1A a set of thirty-two single-precision registers (32 bit) having operand identifications f0 to f31 for floating-point arithmetic operations.

DETAILED DESCRIPTION OF THE PREFERRED EMBODIMENTS

The present invention expands a single-precision floating-point operation into two microinstructions which have a reduced number of possible register dependencies than the original single-precision instruction.

Figure 2:
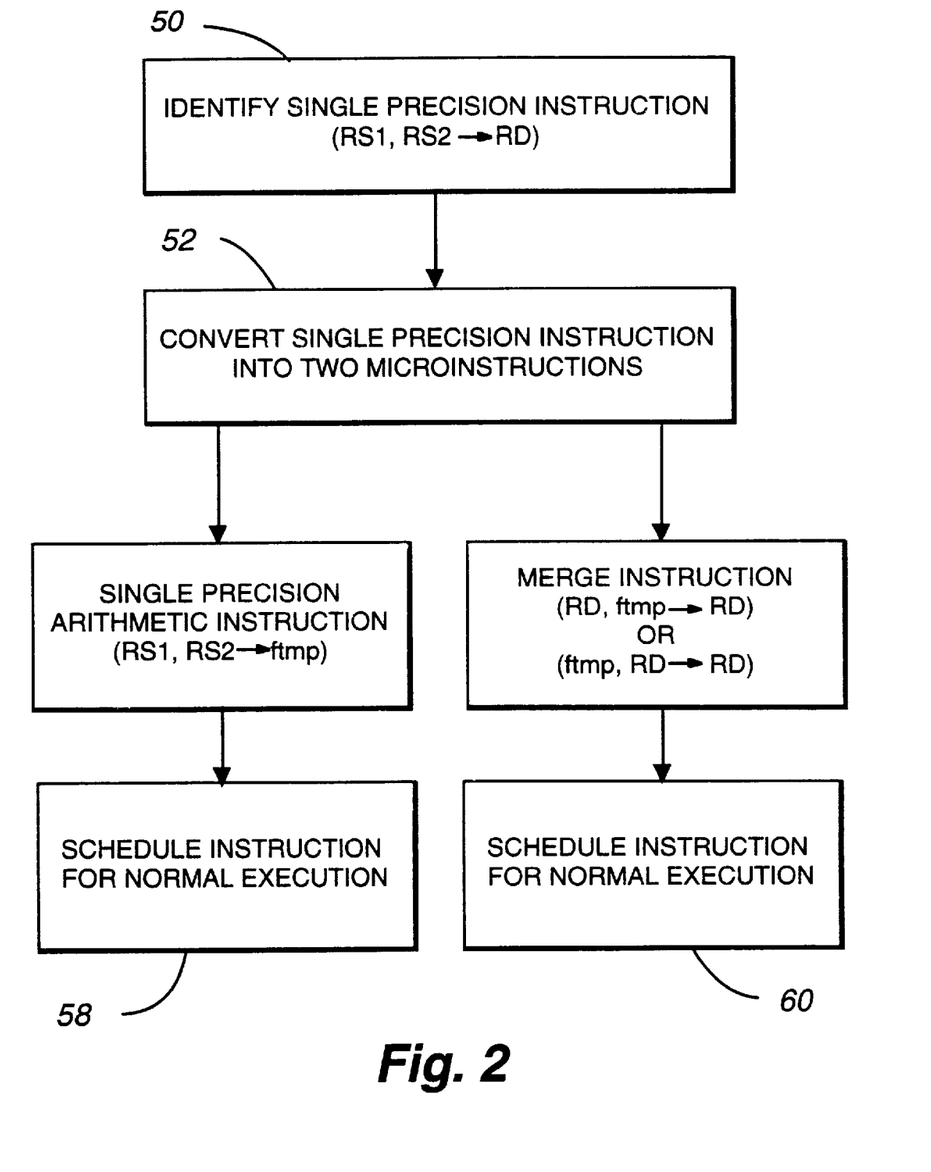
FIG. 2 shows a flow diagram of one embodiment of the present invention.

FIG. 2 illustrates the logical operations performed in accordance with the present invention. Identification operation 50 identifies a single-precision arithmetic instruction from one or more instructions which will be processed by the processor. The identification operation can occur when the instruction is fetched for processing, or later during the processing of the instruction within the processor depending on design choice.

The single-precision instruction specifies an arithmetic function (i.e., add, subtract, multiply, or divide) to be performed using a first and second source register (RS1, RS2). The single precision instruction further specifies a destination register RD where the result is to be stored. Identification operation 50 can be implemented by use of a lookup table containing the op-codes of the single-precision arithmetic operations, or by a suitable decoder or combinatorial logic equivalent using available circuitry.

Conversion operation 52 converts the single-precision arithmetic instruction into two microinstructions for operation within the processor. A single-precision microinstruction is created which performs the arithmetic operation specified by the original instruction, and places the results of the arithmetic operation in a phantom register (shown in FIG. 2 as "ftmp"). A phantom register is defined herein to mean a register which is available within the processor hardware but is not specifically allocated nor externally addressable as a named register of the processor. In other words, a phantom register is specified by the hardware at the time the microinstruction is created by the present invention.

When conversion operation 52 occurs, an available register of the processor is utilized for storage of the results of the arithmetic operation. At any time before, during, or after conversion operation 52 creates the arithmetic microinstruction, conversion operation 52 also creates a merge microinstruction which will merge the results stored in the phantom register and the destination register specified by the original instruction.

After the arithmetic microinstruction has been created, scheduling operation 58 schedules the arithmetic operation for normal execution downstream within the processor. Likewise, scheduling operation 60 schedules the merge microinstruction for normal execution downstream within the processor. The processor will schedule the arithmetic microinstruction to execute prior to the merge microinstruction because of the data dependency of the merge instruction upon the arithmetic microinstruction. Upon completion of the arithmetic microinstruction, the merge microinstruction executes and the data resulting from the arithmetic operation using the two source registers will be placed in the destination register. Therefore, the single-precision instruction, which could normally have up to four dependencies, is divided into two separate microinstructions wherein each microinstruction would have possibly only two data dependencies. As a result, it is not necessary to track four dependencies per instruction to ensure proper execution of both double-precision or single-precision floating-point arithmetic operations.

While the method disclosed herein has been described and shown with reference to particular steps performed in a particular order, it will be understood that these steps may be combined, sub-divided, or re-ordered to form an equivalent method without departing from the teachings of the present invention. Accordingly, unless specifically indicated herein, the order and grouping of the steps is not a limitation of the present invention.

As an example, assume the following single-precision add instruction will be processed within the microprocessor:

fadd.s f2, f4, f6

The method shown in FIG. 2 will identify this instruction as a single-precision instruction and expand the instruction into the following two microinstructions:

| fadd.s | f2, f4, ftmp |
|--------|--------------|
| merge  | f6, ftmp, f6 |

As another example, the single-precision multiply instruction of fmul.s f3, f4, f7 will be identified and expanded into the following two microinstructions:

| fmul.s | f3, f4, ftmp |
|--------|--------------|
| merge  | ftmp, f7, f7 |

Figure 3:
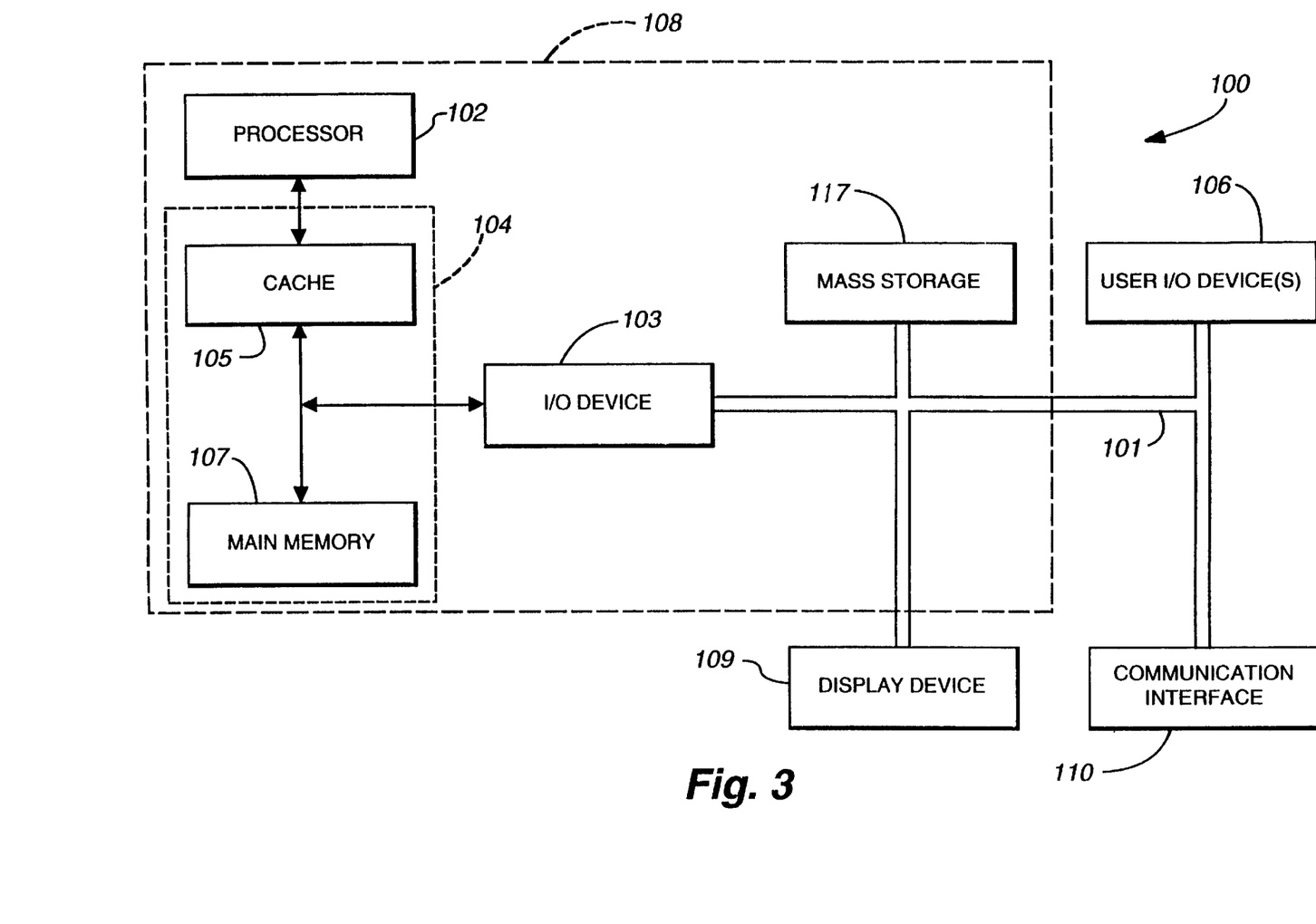
FIG. 3 shows in block diagram form a computer in accordance with the present invention.

Processor architectures can be represented as a collection of interacting functional units as shown in FIG. 3. These functional units, discussed in greater detail below, perform the functions of fetching instructions and data from memory, preprocessing fetched instructions, scheduling instructions to be executed, executing the instructions, managing memory transactions, and interfacing with external circuitry and devices.

The present invention will now be described in terms of apparatus and methods particularly useful in a superpipelined and superscalar processor 102 shown in block diagram form in FIG. 3 and FIG. 4. The particular examples represent implementations useful in high clock frequency operation and processors that issue and executing multiple instructions per cycle (IPC). However, it is expressly understood that the inventive features of the present invention may be usefully embodied in a number of alternative processor architectures that will benefit from the performance features of the present invention. Accordingly, these alternative embodiments are equivalent to the particular embodiments shown and described herein.

FIG. 3 shows a typical general purpose computer system 100 incorporating a processor 102 in accordance with the present invention. Computer system 100 in accordance with the present invention comprises an address/data bus 101 for communicating information, processor 102 coupled with bus 101 through input/output (I/O) device 103 for processing data and executing instructions, and memory system 104 coupled with bus 101 for storing information and instructions for processor 102. Memory system 104 comprises, for example, cache memory 105 and main memory 107. Cache memory 105 includes one or more levels of cache memory. In a typical embodiment, processor 102, I/O device 103, and some or all of cache memory 105 may be integrated in a single integrated circuit, although the specific components and integration density are a matter of design choice selected to meet the needs of a particular application.

User I/O devices 106 are coupled to bus 101 and are operative to communicate information in appropriately structured form to and from the other parts of computer 100. User I/O devices may include a keyboard, mouse, card reader, magnetic or paper tape, magnetic disk, optical disk, or other available input devices, include another computer. Mass storage device 117 is coupled to bus 101 may be implemented using one or more magnetic hard disks, magnetic tapes, CDROMs, large banks of random access memory, or the like. A wide variety of random access and read only memory technologies are available and are equivalent for purposes of the present invention. Mass storage 117 may include computer programs and data stored therein. Some or all of mass storage 117 may be configured to be incorporated as a part of memory system 104.

In a typical computer system 100, processor 102, I/O device 103, memory system 104, and mass storage device 117, are coupled to bus 101 formed on a printed circuit board and integrated into a single housing as suggested by the dashed-line box 108. However, the particular components chosen to be integrated into a single housing is based upon market and design choices. Accordingly, it is expressly understood that fewer or more devices may be incorporated within the housing suggested by dashed line 108.

Display device 109 is used to display messages, data, a graphical or command line user interface, or other communications with the user. Display device 109 may be implemented, for example, by a cathode ray tube (CRT) monitor, liquid crystal display (LCD) or any available equivalent.

Figure 4:
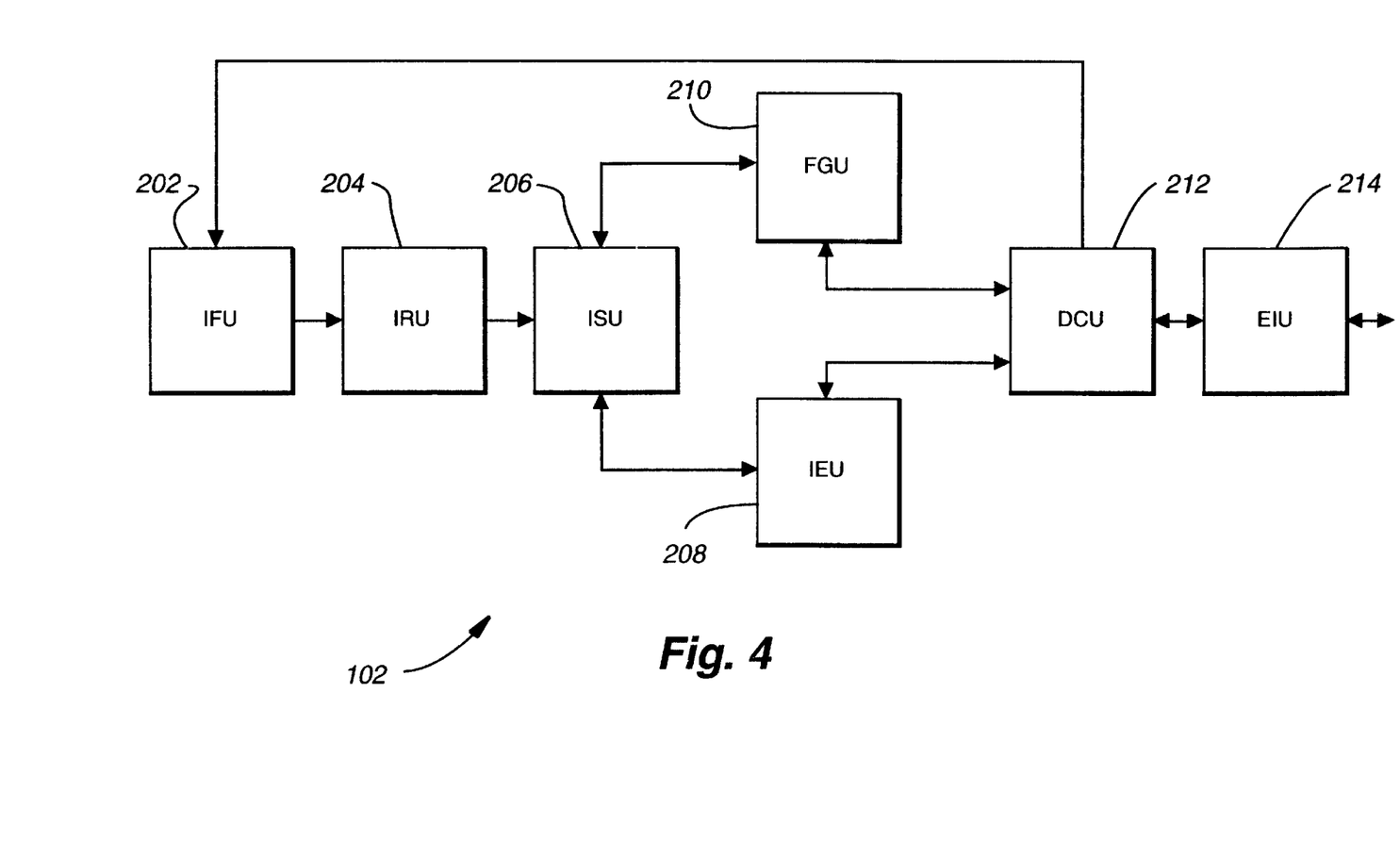
FIG. 4 shows a processor in block diagram form in accordance with the present invention.

FIG. 4 illustrates principle components of processor 102 in greater detail in block diagram form. It is contemplated that processor 102 may be implemented with more or fewer functional components and still benefit from the apparatus and methods of the present invention unless expressly specified herein. Also, functional units are identified using a precise nomenclature for ease of description and understanding, but other nomenclature often is often used to identify equivalent functional units.

Instruction fetch unit (IFU) 202 comprises instruction fetch mechanisms and includes, among other things, an instruction cache for storing instructions, branch prediction logic, and address logic for addressing selected instructions in the instruction cache. The instruction cache is commonly referred to as a portion (I$) of the level one (L1) cache with another portion (D$) of the L1 cache dedicated to data storage. IFU 202 fetches one or more instructions at a time by appropriately addressing the instruction cache. The instruction cache feeds addressed instructions to instruction rename unit (IRU) 204. Preferably, IFU 202 fetches multiple instructions each cycle and in a specific example fetches eight instructions each cycle, know as a fetch bundle. In one implementation of the invention, IFU 202 identifies the single-precision instructions fetched and accordingly supplies a marker bit on each single-precision instruction in the bundle of instructions.

In the absence of conditional branch instruction, IFU 202 addresses the instruction cache sequentially. The branch prediction logic in IFU 202 handles branch instructions, including unconditional branches. An outcome tree of each branch instruction is formed using any of a variety of available branch prediction algorithms and mechanisms. More than one branch can be predicted simultaneously by supplying sufficient branch prediction resources. After the branches are predicted, the address of the predicted branch is applied to the instruction cache rather than the next sequential address.

IRU 204 comprises one or more pipeline stages that include instruction renaming and dependency checking mechanisms. The instruction renaming mechanism is operative to map register specifiers in the instructions to physical register locations and to perform register renaming to prevent dependencies. IRU 204 further comprises dependency checking mechanisms that analyze the instructions to determine if the operands (identified by the instructions' register operands or specifiers) cannot be determined until another "live instruction" has completed. The term "live instruction" as used herein refers to any instruction that has been fetched from the instruction cache but has not yet completed or been retired. IRU 204 is described in greater detail with reference to FIGS. 5 and 6. IRU 204 outputs renamed instructions to instruction scheduling unit (ISU) 206.

Program code may contain complex instructions, also called "macroinstructions," from the running object code. Since processor 102 can be optimized for double-precision operations in accordance with the present invention, it is desirable to treat single-precision instructions as complex instructions and expand the single-precision instructions into a plurality of simple instructions or "microinstructions" to simplify and expedite execution. In a specific implementation of the present invention, the execution units are optimized to precisely handle instructions with a limited number of dependencies using a limited number of resources. Complex instructions would comprise any instructions that require more than the limited number of resources or involve more than the limited number of dependencies (i.e., a single-precision instruction). IRU 204 includes mechanisms to translate or expand complex single-precision instructions into a plurality of microinstructions. These microinstructions are executed more efficiently in the execution units (e.g., floating-point and graphics execution unit (FGU) 210 and integer execution unit (IEU)) and have fewer possible register dependencies than could the macroinstructions. IRU 204 will be discussed in greater detail with reference to FIGS. 5 and 6.

ISU 206 receives renamed instructions from IRU 204 and registers them for execution. ISU 206 is operative to schedule and dispatch instructions as soon as their dependencies have been satisfied into an appropriate execution unit (e.g., integer execution unit (IEU) 208, or floating-point and graphics unit (FGU) 210). ISU 206 also maintains trap status of live instructions. ISU 206 may perform other functions such as maintaining the correct architectural state of processor 102, including state maintenance when out-of-order instruction processing is used. ISU 206 may include mechanisms to redirect execution appropriately when traps or interrupts occur and to ensure efficient execution of multiple threads where multiple threaded operation is used. Multiple thread operation means that processor 102 is running multiple substantially independent processes simultaneously. Multiple thread operation is consistent with but not required by the present invention.

ISU 206 also operates to retire executed instructions when completed by IEU 208 or FGU 210. ISU 206 performs the appropriate updates to architectural register files and condition code registers upon complete execution of an instruction. ISU 206 is responsive to exception conditions and discards or flushes operations being performed on instructions subsequent to an instruction generating an exception in the program order. ISU 206 quickly removes instructions from a mispredicted branch and initiates IFU 202 to fetch from the correct branch. An instruction is retired when it has finished execution and all instructions from which it depends have completed. Upon retirement the instruction's result is written into the appropriate register file and is no longer deemed a "live instruction".

IEU 208 includes one or more pipelines, each pipeline comprising one or more stages that implement integer instructions. IEU 208 also includes mechanisms for holding the results and state of speculatively executed integer instructions. IEU 208 functions to perform final decoding of integer instructions before they are executed on the execution units and to determine operand bypassing amongst instructions in an out-of-order processor. IEU 208 executes all integer instructions including determining correct virtual addresses for load/store instructions. IEU 208 also maintains correct architectural register state for a plurality of integer registers in processor 102. IEU 208 preferably includes mechanisms to access single and/or double-precision architectural registers as well as single and/or double-precision rename registers.

The floating point graphics and execution unit FGU 210 includes one or more pipelines, each comprising one or more stages that implement floating-point instructions. FGU 210 also includes mechanisms for holding the results and state of speculatively executed floating-point and graphic instructions. FGU 210 functions to perform final decoding of floating-point instructions before they are executed on the execution units and to determine operand bypassing amongst instructions in an out-of-order processor. In the specific example, FGU 210 includes one or more pipelines dedicated to implement special purpose multimedia and graphic instructions that are extensions to standard architectural instructions for a processor. FGU 210 may be equivalently substituted with a floating-point unit (FPU) in designs in which special purpose graphic and multimedia instructions are not used. FGU 210 preferably includes mechanisms to access single and/or double-precision architectural registers as well as single and/or double-precision rename registers.

A data cache memory unit (DCU) 212, including cache memory 105 shown in FIG. 1, functions to cache memory reads from off-chip memory through external interface unit (EIU) 214. Optionally, DCU 212 also caches memory write transactions. DCU 212 comprises one or more hierarchical levels of cache memory and the associated logic to control the cache memory. One or more of the cache levels within DCU 212 may be read only memory to eliminate the logic associated with cache writes.

Figure 5:
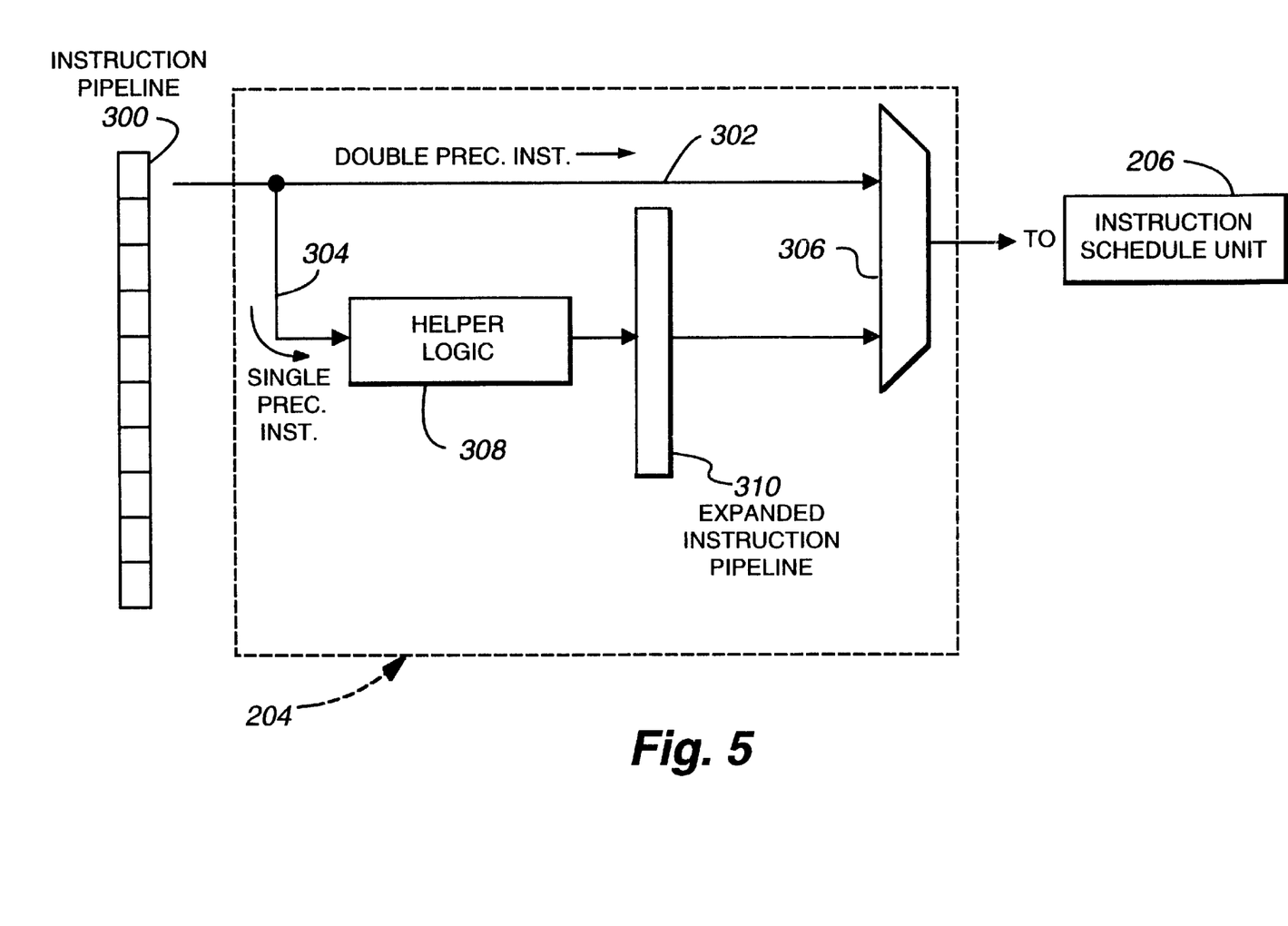
FIG. 5 shows an instruction flow path from and instruction pipeline to a scheduling unit, and helper logic of the instruction renaming unit 204 for expanding a single-precision instruction into two microinstructions, incorporating the apparatus in accordance with the present invention.

FIG. 5 illustrates a block diagram of the instruction renaming unit IRU 204 in accordance with the present invention. Instruction pipeline 300 contains a variety of instructions—including floating-point instructions—which are passed, after renaming, to the instruction scheduling unit ISU 206 (FIG. 4) and ultimately executed by the floating-point graphics unit FGU 210 (FIG. 4). As shown in FIG. 4, there are two paths for the instructions from pipeline 300 to travel depending upon the nature of the instruction. The single-precision instructions travel along path 304 through helper logic 308 for expansion into microinstructions, while the double-precision instructions pass along path 302 directly to the multiplexor 306. Multiplexor 306 is used to select the passing of instructions from the IRU to the instruction scheduling unit ISU 206. This arrangement of instruction paths is optimized for double-precision instructions because double-precision instructions bypass the helper logic 308. In contrast, single-precision instructions must be processed by the helper logic 308 and, after expansion into two or more microinstructions, are placed into an expanded instruction pipeline 310.

Figure 6:
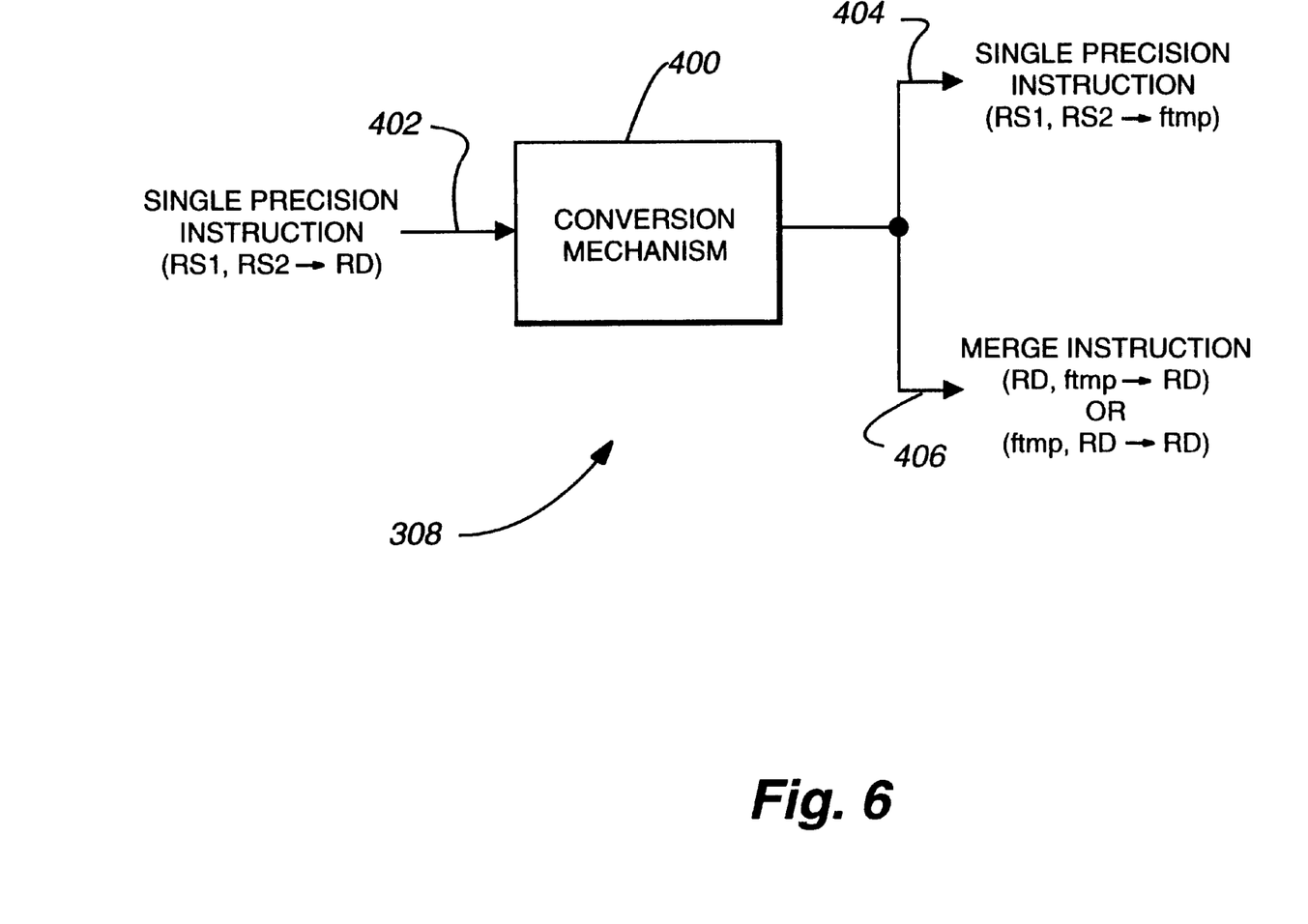
FIG. 6 shows the conversion mechanism of the instruction helper logic in block diagram form in accordance with the present invention.

The functions performed by helper logic 308 are shown in greater detail in FIG. 6. A conversion mechanism 400 converts a single-precision instruction 402 into two microinstructions, 404 and 406. Microinstruction 404 is a single-precision arithmetic instruction which performs the same arithmetic operation specified by single-precision instruction 402. However, single-precision instruction 404 stores the results of the arithmetic operation into a phantom register "ftmp", described above. Microinstruction 406 merges the destination register specified by instruction 402 with the phantom register so that the contents of the phantom register are placed in the appropriate location within the specified destination register.

In this manner, a single-precision operation having four possible dependencies is converted into two microinstructions each having at most two dependencies. The two microinstructions created and executed in accordance with the present invention result in correct data being stored in a destination register specified by the original instruction and so is invisible to the software. Hence, the number of dependencies per instruction which the processor is required to track is reduced, thereby reducing the resources required to perform such dependency tracking.

While the invention has been particularly shown and described with reference to a preferred embodiment thereof, it will be understood by those skills in the art that various other changes in the form and details may be made without departing from the spirit and scope of the invention. For instance, while the present invention has been described with reference to a processor architecture shown in FIG. 4, it will be understood that the present invention could be used in other equivalent processor designs.

What is claimed is:

1. A processor that executes single-precision and double-precision floating-point instructions, the processor comprising:

a register file comprising a plurality of double-precision registers, each of said double-precision registers comprising a first and second single-precision register, wherein each of said first and second single-precision registers are aliased into a corresponding double-precision register;

a phantom register;

renaming logic for expanding a single-precision instruction specifying a first and second source register and a destination register, into a first and second microinstruction, said first microinstruction coded for performing the arithmetic operation specified by said single-precision instruction using said first and second source registers and storing a result in the phantom register; and said second microinstruction coded for merging the contents of said phantom register and said destination register.

2. The processor of claim 1, further comprising:

an instruction cache for holding a plurality of instructions for processing; and an instruction fetch unit for fetching an instruction from said plurality of instruction in the instruction cache, said instruction fetch unit determining if said instruction is a single-precision instruction and providing a marker on said single-precision instruction.

3. The processor of claim 1, further comprising:

an instruction scheduling unit for scheduling said first and second microinstructions for execution; and an execution unit for executing floating-point instructions.

4. The processor of claim 3, wherein said instruction scheduling unit dispatches said second microinstruction for execution in said execution unit after said first microinstruction has been executed in said execution unit.

5. The processor of claim 1, wherein said single-precision instruction specifies adding the contents of said first and second source registers and storing the results in said destination register.

6. The processor of claim 1, wherein said single-precision instruction specifies multiplying the contents of said first and second source registers and storing the results in said destination register.

7. A computer system comprising:

a memory system;

a processor coupled to the memory system, the processor further comprising:

a register file comprising a plurality of double-precision registers, each of said double-precision registers comprising a first and second single-precision register, wherein each of said first and second single-precision registers are aliased into a corresponding double-precision register;

a phantom register;

renaming logic for expanding a single-precision instruction into a first and second microinstruction, said single-precision instruction having a first source register, a second source register, and a destination register;

said first microinstruction coded for performing the arithmetic operation specified by said single-precision instruction using said first and second source registers and storing a result in the phantom register; and said second microinstruction coded for merging the contents of said phantom register and said destination register.

8. The computer system of claim 7, further comprising:

an instruction cache for holding a plurality of instructions for processing; and an instruction fetch unit for fetching an instruction from said plurality of instruction in the instruction cache, said instruction fetch unit determining if said instruction is a single-precision instruction and providing a marker on said single-precision instruction.

9. The computer systems of claim 7, further comprising:

an instruction scheduling unit for scheduling said first and second microinstructions for execution; and an execution unit for executing floating-point instructions.

10. The computer system of claim 9, wherein said instruction scheduling unit dispatches said second microinstruction for execution in said execution unit after said first microinstruction has been executed in said execution unit.

11. The computer system of claim 7, wherein said single-precision instruction specifies adding the contents of said first and second source registers and storing the results in said destination register.

12. The computer system of claim 7, wherein said single-precision instruction specifies multiplying the contents of said first and second source registers and storing the results in said destination register.

* * * * *